(12) United States Patent
Oleschuk et al.

(10) Patent No.: US 10,297,435 B2
(45) Date of Patent: May 21, 2019

(54) MICRO-NOZZLE ARRAY

(71) Applicant: Queen's University at Kingston, Kingston (CA)

(72) Inventors: Richard D. Oleschuk, Kingston (CA); Yueqiao Fu, Toronto (CA); Graham Gibson, Kingston (CA); Timothy Hutama, Kingston (CA)

(73) Assignee: Queen's University at Kingston, Kingston, Ontario (CA)

( * ) Notice: Subject to any disclaimer, the term of this patent is extended or adjusted under 35 U.S.C. 154(b) by 175 days.

(21) Appl. No.: 15/007,708

(22) Filed: Jan. 27, 2016

(65) Prior Publication Data

US 2016/0217994 A1 Jul. 28, 2016

Related U.S. Application Data

(60) Provisional application No. 62/108,295, filed on Jan. 27, 2015.

(51) Int. Cl.
*H01J 49/16* (2006.01)
*C03B 37/012* (2006.01)
(Continued)

(52) U.S. Cl.
CPC ...... *H01J 49/167* (2013.01); *C03B 37/01211* (2013.01); *C03B 37/01228* (2013.01);
(Continued)

(58) Field of Classification Search
CPC ......... B05B 1/18; H01J 49/165; H01J 49/167; H01J 49/26; H01J 49/168; C03B 37/14;
(Continued)

(56) References Cited

U.S. PATENT DOCUMENTS 6,594,432 B2 * 7/2003 Chen .................. B01J 19/0046
385/127
7,105,812 B2 9/2006 Zhao et al.
(Continued)

FOREIGN PATENT DOCUMENTS

WO WO2007/127631 A1 11/2007
WO WO2009/005476 A1 1/2009

OTHER PUBLICATIONS

Buhler, J., et al., "Silicon dioxide sacrificial layer etching in surface micromachining", J. Micromech. Microeng. No. 7, R1-R13, (1997).
(Continued)

*Primary Examiner* — Jason J Boeckmann
(74) *Attorney, Agent, or Firm* — Stephen J. Scribner (57) ABSTRACT

The invention relates to a micro-nozzle array comprising a plurality of capillaries comprising a first silica-based material and a second silica-based material substantially surrounding the first silica-based material of the plurality of capillaries, and a plurality of nozzles extending beyond a face of the micro-nozzle array, each nozzle corresponding to a single capillary, wherein each nozzle comprises the first silica-based material. The micro-nozzle array may be used in hydrodynamic or electro-osmotic applications. In one embodiment the micro-nozzle array is a multiple electrospray emitter. The invention also relates to methods for preparing and using micro-nozzle arrays.

18 Claims, 9 Drawing Sheets

(51) Int. Cl.
*C03B 37/075* (2006.01)
*C03B 37/14* (2006.01)

(52) U.S. Cl.
CPC .... *C03B 37/01251* (2013.01); *C03B 37/0756* (2013.01); *C03B 37/14* (2013.01); *H01J 49/165* (2013.01)

(58) Field of Classification Search
CPC .......... C03B 37/0756; C03B 37/01228; C03B 37/01251; C03B 37/01211
USPC ........................................................ 239/548
See application file for complete search history.

(56) References Cited

U.S. PATENT DOCUMENTS

| | | | |
|---|---|---|---|
| 7,108,775 B2 | 9/2006 | Bahatt et al. | |
| 7,208,727 B2 | 4/2007 | Fedorov et al. | |
| 8,022,361 B2 | 9/2011 | Wang et al. | |
| 8,373,116 B2* | 2/2013 | Oleschuk | B05B 5/0255 239/3 |
| 2009/0230296 A1* | 9/2009 | Kelly | H01J 49/167 250/281 |
| 2011/0147576 A1* | 6/2011 | Wouters | H01J 49/167 250/282 |

OTHER PUBLICATIONS

Gibson, G.T.T., et al., "Nanoelectrospray Emitters: Trends and Perspective", Mass Specfrometry Reviews, No. 28, 918-936, (2009).
Jang, S-M., et al., "Chemical Vapor Deposition of Epitaxial Silicon-Germanium from Silance and Germane", J. Electrochem. Soc., vol. 142, No. 10, 3513-3520, (1995).
Kelly, R.T., et al., "Chemically Etched Open Tubular and Monolithic Emitters for Nanoelectrospray Ionization Mass Spectrometry", Anal. Chem., vol. 78, No. 22, 7796-7801, (2006).
Kelly, R.T., et al., "Array of Chemically Etched Fused-Silica Emitters for Improving the Sensitivity and Quantitation of Electrospray Ionization Mass Spectrometry", Anal. Chem.., vol. 79, No. 11, 4192-4198, (2007).
Kelly R.T., et al., "Nanoelectrospray Emitter Arrays Providing Interemitter Electric Field Uniformity", Anal. Chem., vol. 80, No. 14, 5660-5665, (2008).
Kelly, R.T., et al., "Capillary-Based Multi Nanoelectrospray Emitters: Improvements in Ion Transmission Efficiency and Implementation with Capillary Reversed-Phase LC-ESI-MS", Anal. Chem., vol. 80, No. 1, 143-149, (2008).
Kim, W., et al., "Microfabricated Monolithic Multinozzle Emitters for Nanoelectrospray Mass Spectromety", Anal. Chem., vol. 79, No. 10, 3703-3707, (2007).
Kunii, Y., et al., "Wet Etching of Doped and Nondoped Silicon Oxide Films Using Buffered Hydrogen Fluoride Solution", J. Electrochem. Soc., vol. 142, No. 10, 3510-3513 (1995).
Luo, Q., et al., "On-Line 1D and 2D Porous Layer Open Tubular/ LC-ESI-MS Using 10-um-i.d. Poly (styrene-divinylbenzene) Columns for Ultrasensitive Proteomic Analysis", Anal. Chem., vol. 79, No. 16, 6174-6181, (2007).
Pevec, S., et al., "Micromachining of Optical Fibers Using Selective Etching Based on Phosphorus Pentoxide Doping", IEEE Photonics Journal, vol. 3, No. 4, 627-632, (2011).
Russell, P., "Photonic Crystal Fibers", Science, vol. 299, 358-362, (2003).
Su, S., et al., "Microstructured Photonic Fibers as Multichannel Electrospray Emitters", Anal. Chem., vol. 81, No. 17, 7281-7287, (2009).
Sun, Y., et al., "Faster and improved microchip electrophoresis using a capillary bundle", Electrophoresis, vol. 28, 4765-4768, (2007).
Tang, K., et al., "Generation of Multiple Electrosprays Using Microfabricated Emitter Arrays for Improved Mass Spectrometric Sensitivity", Anal. Chem., vol. 73, No. 8, 1658-1663, (2001).

* cited by examiner

MICRO-NOZZLE ARRAY

RELATED APPLICATION

This application claims the benefit of the filing date of Application No. 62/108,295, filed on 27 Jan. 2015, the contents of which are incorporated herein by reference.

FIELD

This invention relates to micro-nozzle arrays used in fields such as biochemical sampling and analysis. This invention also related to methods of preparing micro-nozzle arrays.

BACKGROUND

A limitation in fields such as biochemical sampling and analysis is the ability to precisely control uptake and/or dispersion of small quantities of fluid samples. For example, mass spectrometry (MS) is a common technique used in the analysis of biological samples such as proteins, where precisely controlled dispersion is required. Dispersion of the sample through an emitter using electrospray ionization (ESI) limits the degree of fragmentation compared to other methods such as electron ionization (EI) or chemical ionization (CI). As the flow rate drops, charged droplets that are ejected from the electrospray plume become smaller and the efficiency of charge transfer to analyte molecules in solution improves. Moving to flow rates below about 1000 nL/min, the so-called nano-electrospray (nanoESI) regime is reached leading to best ionization efficiency and the elimination of charge competition between analytes. The architecture of the emitter is important for generating stable electrospray, where cone-jet mode (a Taylor cone) is supported by a range of tip diameters at a given flow rate and applied voltage, with finer tips having smaller diameters being useful for lower flow rates. Popular commercial emitters for these lower flow rates are fused-silica capillaries that have been pulled to a fine, tapered exit. These single-channel tapered emitters are limited in the range of flow rates they can use for nanoESI, and suffer from clogging when the diameter gets small (<15 μm diameter). Furthermore, flow rates below ~100 nL/min are difficult to control, and are not compatible with upstream fluidic applications such as nano-liquid chromatography (nano-LC).

One way to take advantage of the benefits of low-flow nanoESI while using higher flow rates is to split the input flow into many smaller flows, each generating its own Taylor cone independent of one another. In this way, the effects of small charged droplets are still observed but the input flow is more reasonable and all of the analyte solution reaches the MS. The theoretical relationship between electrospray current ($I_{total}$) at a given flow rate and the electrospray current ($I_s$) of the same flow split into n individual emitters has been found to be $I_{total}=\sqrt{n}I_s$, meaning that the detection signal can be enhanced by a factor of $\sqrt{n}$ by having an emitter with n separate spraying tips. A variety of emitters have been developed using this approach, including examples fabricated by microchip fabrication techniques, laser ablation, or simply assembling an array of conventional fused-silica capillary-based emitters. Drawbacks of such multiple electrospray (MES) emitters are that they are typically large and do not couple well with traditional MS inlets, and/or they are complicated to fabricate.

Microstructured fibres (MSFs) present an alternative approach to MES emitters, as they essentially comprise a series of channels in a single fibre having dimensions compatible with conventional LC and MS equipment. These fibres are used in the field of photonics, where the channels are part of a cladding designed to guide light through the core by total internal reflectance. MSFs have also been demonstrated as sensors, using the channels to introduce analytes and measuring changes in the light propagated in the fibre.

The construction of MSFs starts with a preform at a manageable scale, either a disc through which holes are drilled or, more often, an assembly of tubes and rods, where the placement of the holes/tubes is pre-determined. This preform is then drawn, sometimes in steps, at high temperatures to a thin fibre that retains the pattern of the preform. In commercial MSFs, the channels are arranged to provide the best light-guiding performance, and typically there is a dense array of evenly-spaced homogeneous channels surrounding the core, usually in a circular or hexagonal pattern, with a pitch (distance between adjacent channels) on the order of ~10-15 μm. Although commercially-available MSFs have been used as nanoESI emitters, MES was not observed as there is no barrier to flow from adjacent channels coalescing into a single spray. Limitations on commercially available MSFs, arising from their intended use in photonic applications which do not require channels spaced farther apart, make it difficult or impossible to achieve MES behaviour in emitter applications. Modifications, such as formation of polymer nozzles at the emitter tip in each channel, can provide MES behaviour under a certain conditions. However, the polymer nozzles complicate the fabrication process, are fragile, and may not be compatible with all analytes.

SUMMARY

According to one aspect there is provided a micro-nozzle array, comprising: a plurality of capillaries, each capillary comprising a first silica-based material; a second silica-based material substantially surrounding the first silica-based material of the plurality of capillaries; a plurality of nozzles extending beyond a face of the micro-nozzle array, each nozzle corresponding to a single capillary; wherein each nozzle comprises the first silica-based material.

The nozzles and/or the face of the array may further comprise a treatment or a coating applied thereto. At least one of the first silica-based material and the second silica-based material may be doped. In one embodiment, the first silica-based material is substantially pure silica. In one embodiment, the second silica-based material is boron doped silica.

The micro-nozzle array may be used in a hydrodynamic application and/or an electro-osmotic application. A hydrodynamic or electro-osmotic device may comprise the micro-nozzle array. In one embodiment a MES emitter comprises the micro-nozzle array.

According to another aspect there is provided a method of preparing a micro-nozzle array, comprising: micro-machining a face of a MSF comprising: a plurality of capillaries, each capillary comprising a first silica-based material; and a second silica-based material substantially surrounding the first silica-based material of the plurality of capillaries; wherein the micro-machining produces a plurality of nozzles extending beyond the face of the array, each nozzle corresponding to a single capillary; wherein each nozzle comprises the first silica-based material.

The method may further comprise applying a treatment or a coating to the nozzles and/or the face of the array. At least one of the first silica-based material and the second silica-based material may be doped. In one embodiment the first silica-based material is substantially pure silica. In one embodiment the second silica-based material is boron doped silica. In one embodiment micro-machining comprises chemical etching at least the face of the MSF.

According to another aspect there is provided a method comprising using a micro-nozzle array as described herein in a hydrodynamic application and/or an electro-osmotic application. One embodiment comprises using the micro-nozzle array as a MES emitter.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 6A-6F are SEM images of a MSF before etching (A), and after etching in HF for 6 minutes (B), 8 minutes (C), 10 minutes (D), 12 minutes (E), and 17 minutes (F);

DETAILED DESCRIPTION OF EMBODIMENTS

Figure 13A:
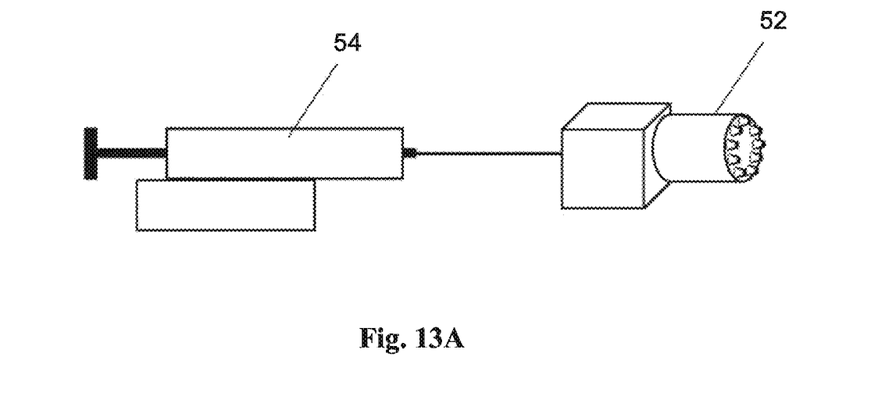
FIG. 13A is a diagram of a micro-nozzle array used in a hydrodynamic application, according to one embodiment.
Figure 13B:
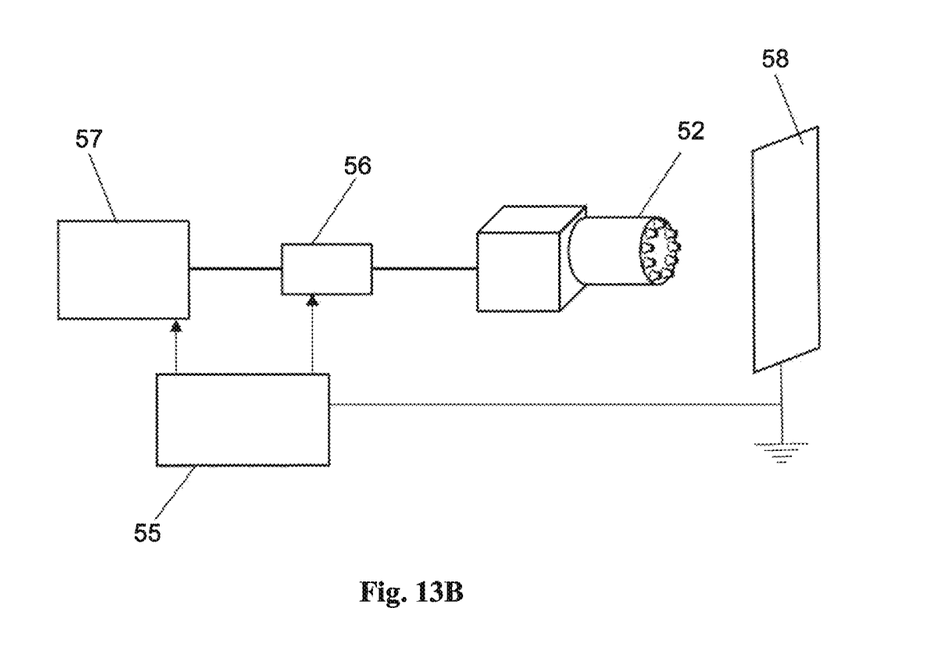
FIG. 13B is a diagram of a micro-nozzle array used in an electro-osmotic application, according to one embodiment.

This invention relates to micro-nozzle arrays used in fields such as biochemical sampling and analysis. Embodiments may be used in applications requiring flow in or out of the nozzles; that is, in uptake applications, such as in obtaining fluid samples, and in applications involving dispersion of samples. The flow may be, for example, hydrodynamic or electro-osmotic. For example, as shown in FIG. 13A, in a hydrodynamic application a sample may be supplied to a micro-nozzle array 52 using a syringe pump 54. In another example, shown in FIG. 13B, in an electro-osmotic application a sample may be supplied to a micro-nozzle array 52 by applying electrical potentials from a source 55 to a sample reservoir 57 and electrode 56, with a grounded plate 58. Advantages of the embodiments include one or more of, but are not limited to: multiple channels, providing less susceptibility to clogging and hence high reliability; and small size of channels, providing low flow rates and hence greater sensitivity and control, and supporting stable cone-jet mode electrospray. One embodiment relates to a multiple electrospray (MES) emitter for mass spectrometry, for example, configured as shown in FIG. 13B. Also described herein are methods for preparing micro-nozzle arrays from microstructured fibres.

Accordingly, one aspect of the invention relates to a micro-nozzle array including a plurality of separate or distinct channels, each channel terminating with a nozzle on the array face from which an analyte is dispersed or taken up. In general, a micro-nozzle array as exemplified by the embodiments described herein is easily produced, inexpensive, long lasting, and able to resist clogging.

Figure 1:
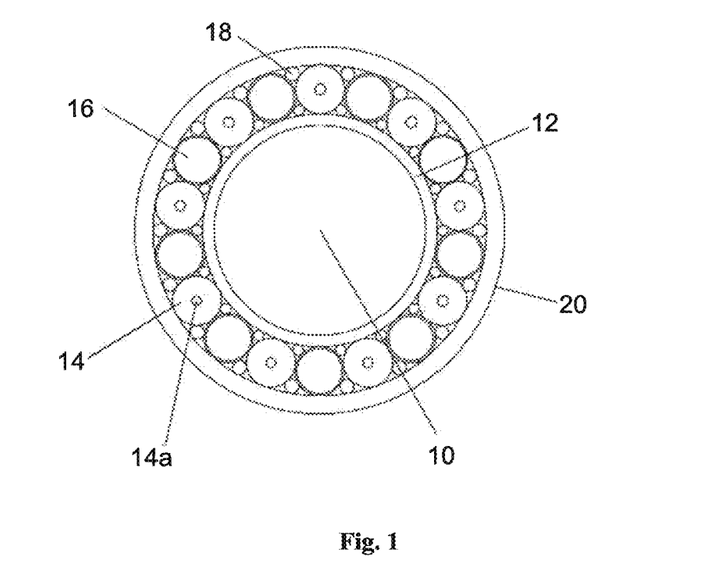
FIG. 1A is a diagram of a cross-section of a MSF with boron-doped regions and nine channels arranged in a radial array, used to prepare a micro-nozzle array, according to one embodiment.
FIG. 1B is a diagram of a micro-nozzle array prepared from the MSF of FIG. 1A, according to one embodiment.

Micro-nozzle arrays as described herein may comprise two or more silica-based materials. For example, one embodiment may include a plurality of hollow capillaries made of a first silica-based material, and at least a second silica-based material substantially or completely surrounding the capillaries. At least one of the silica-based materials may be substantially pure silica. At least one of the silica-base materials may be a doped silica material. The capillaries, which may be in a spaced, substantially parallel relationship to each other, relative to their longitudinal axes, are the individual channels. FIG. 1A is a diagram showing an arrangement of silica and doped silica components used to make a preform, from which an MSF is drawn, according to one embodiment (described in detail in the below example). The arrangement of components and number of capillaries may of course be varied according to desired performance characteristics and/or for a specific application.

The capillaries, which form the channels of the micro-nozzle array, each protrude from or extend beyond the face of the array (i.e., the face of the MSF), as individual nozzles. Thus, structurally, the nozzles are of the same material as the capillaries. However, a coating or treatment may be applied to the nozzles and/or the face of the array. A micro-nozzle array may comprise a length of MSF comprising at least first and second silica-based materials arranged as described above, which has been micro-machined (e.g., etched) to produce the nozzles. The face of the micro-nozzle array thus exhibits an array of protruding nozzles, wherein the array may comprise multiple rows (or columns) of nozzles, or radially-arranged nozzles (e.g., relative to a central axis of the array), or in some other arrangement. The array may be symmetrical or asymmetrical with respect to, for example, the central axis of the array. The nozzles may be arranged such that they are equidistant from each other and/or equidistant from the central axis of the fibre. The nozzles may extend beyond the face of the MSF by, e.g., 5-200 µm, 10-100 µm, or 10-50 µm, or 20-40 µm. In one embodiment, such extension of the nozzles beyond the face of the MSF supports stable cone-jet mode dispersion of a liquid.

Another aspect of the invention relates to methods of preparing a micro-nozzle array including a plurality of separate or distinct channels, each channel terminating with nozzle on the array face from which an analyte is dispersed or taken up. The methods may comprise preparing micro-nozzle arrays from two or more silica-based materials. For example, one embodiment may comprise preparing a micro-nozzle array from a plurality of hollow capillaries made of a first silica-based material, and at least a second silica-based material substantially or completely surrounding the capillaries, and forming individual nozzles from the capillaries, each nozzle protruding from or extending beyond the face of the micro-nozzle array, such that the nozzles are of the same material as the capillaries. The method may further include applying a coating or treatment to the nozzles and/or the face of the array. The method may comprise preparing a MSF comprising at least first and second silica-based materials arranged as described above. The method may comprise preparing a micro-nozzle array from such a MSF, including micro-machining (e.g., etching) a face of the MSF to produce the nozzles.

A MSF may be drawn from a preform comprising pure or substantially pure silica capillaries and doped silica rods, and micro-machining (e.g., selective etching) applied to a face of a length of the MSF to produce raised nozzles where the silica capillaries were placed. Dopants and etchants may be selected to produce a desired result, where a doped silica may be etched faster or slower than a substantially pure silica, for a selected etchant. Drawing MSFs from these kinds of preforms requires great care, since doped silicas melt at different temperatures than substantially pure silica, which can cause deformations in the channel structure of the final MSF or fragility in the drawn fibres.

For example, a MSF may comprise pure or substantially pure silica capillaries and boron doped silica rods, and selective etching of the MSF to produce a micro-nozzle array may comprise one or both of using hydrofluoric acid (HF), which etches boron doped regions faster than silica to leave depressions, and ammonium bifluoride (AF), which etches doped regions slower than silica to leave raised plateaus. Both of these etchants are in equilibrium in aqueous solution. The difference in etching selectivity arises primarily from the dependence of etchant speciation on pH, the HF solution being acidic and AF being basic.

One embodiment relates to a micro-nozzle array fabricated from a MSF having silica channels surrounded by boron-doped silica, such that selective etching by HF leads to the silica channels rising above the rest of the fibre tip to form nozzles.

Embodiments will be described herein primarily with respect to a MES emitter; however, it will be readily understood that the invention is not limited thereto.

The reliability and sensitivity of a nano-electrospray ionization/mass spectrometry (nanoESI/MS) system is dependent on the emitter. Sensitivity can be greatly improved by using a low flow rate, e.g., in the tens of nL/min range, as the ionization efficiency improves at lower flow rates due to the generation of smaller charged droplets of the analyte. In an effort to achieve this sensitivity enhancement while maintaining higher flow rates more compatible with front-end liquid separations and existing pumps, micro-nozzle arrays as described herein were used to prepare emitters that generate multiple electrosprays.

MES emitters as described herein have dimensions compatible with conventional LC and MS systems, and may be used in LC/MS analysis applications without any special adaptations. Accordingly, they offer a drop-in replacement for commercial tapered emitters, and greatly improve electrospray signal and flexibility in spray conditions with much-improved resistance to clogging, without sacrificing signal stability or physical robustness. These attributes make the emitters highly applicable to a wide variety of fields where ion signal is important, especially where sample is scarce, such as in proteomics.

Embodiments will be further described by way of the following non-limiting Example.

EXAMPLE

The design, fabrication, and application of a micro-nozzle array MES emitter will be described.

Chemicals and Materials

Glacial acetic acid, methanol, acetonitrile (HPLC grade), toluene and deionized water (Protocol®) were purchased from Fisher Scientific (Ottawa, ON, Canada) and used without further purification. Formic acid (analytical reagent, 98%) was purchased from BDH Chemicals (Toronto, ON, Canada). 3-(trimethoxysilyl)propyl methacrylate (γ-MPS, 1) (98%), leucine enkephalin (LE, 2) (synthetic acetate salt), and hydrofluoric acid (48 wt % in $H_2O$, ≥99.99%) were purchased from Aldrich (Oakville, ON, Canada). (Tridecafluoro-1,1,2,2-tetrahydrodecyl)dimethylchlorosilane (TFDCS, 3) and (heptadecafluoro-1,1,2,2-tetrahydrodecyl) dimethylchlorosilane (HFDCS, 4) were purchased from Gelest Inc. (Morrisville, Pa., USA). Pulled-tip nanoelectrospray emitters (non-coated 8 or 10 µm internal tip diameter, SilicaTip™) were purchased from New Objective (Woburn, Mass., USA).

MSF Design

In this example the MSF was designed to have nine equivalent channels spaced evenly and as far from each other as possible in a radial pattern, FIG. 1A is a diagram showing the arrangement of silica and doped silica components used to make the preform, from which an MSF was drawn. A large borosilicate rod 10 was inserted into a large thin-walled silica capillary 12. Surrounding this were nine silica capillaries 14 and nine borosilicate glass rods 16, with 36 small filler rods 18 among them, which together was inserted into an outer silica tube 20. The target outer diameter (o.d.) of the fibre was 360 n to match standard fused-silica capillary, for which plastic fittings are commercially available (e.g., IDEX Health & Science LLC, Oak Harbor, Wash., USA). The nine capillaries 14 that formed the channels 14a were made of pure silica. The large centre rod 10 and small rods 16, 16 that filled the space around the nine silica capillaries were doped by 9 mol % boron. Because these doped regions are etched faster than the silica capillaries by HF, the capillaries form nozzles protruding from the fiber tip. The capillaries had thick walls to ensure the nozzles protruded far above the emitter tip after the etching process, as the etchant also removes some silica. The target channel diameter was 10 µm, which is similar to the aperture diameter of standard tapered nanoelectrospray emitters. All channels resided on a centred circle with a target diameter of 275 µm, with a pitch (i.e., distance between adjacent channels 14a in the lattice) of 100 µm.

FIG. 1B is a diagram showing an idealized micro-nozzle array produced from the MSF as described above. As a result of differences in etching rates of the two silicate materials, more borosilicate material has been removed such that the nine silica capillaries 14 form the array of micro-nozzles which extend beyond the face 22 of the array. The open channels 14a of the capillaries are shown at the tips of the micro-nozzles.

Figure 2:
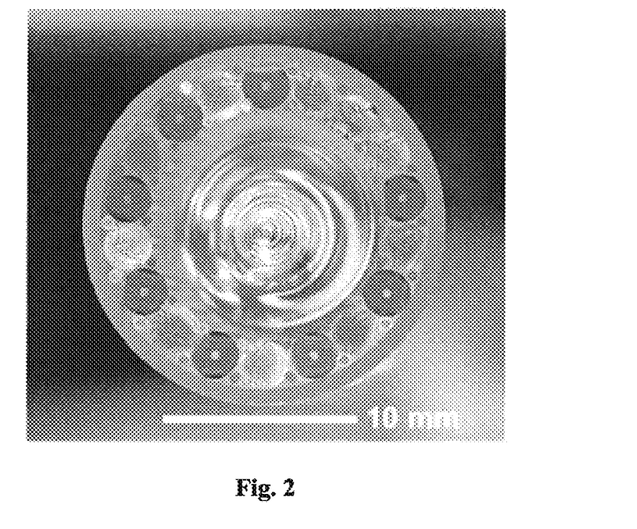
FIG. 2 is a photomicrograph of the MSF of FIG. 1.

The MSF was fabricated by Canada's Excellence Research Chair (CERC) in photonics innovations (Québec City, Canada). An optical image of the preform is shown in FIG. 2.

Emitter Preparation

Figure 3A:
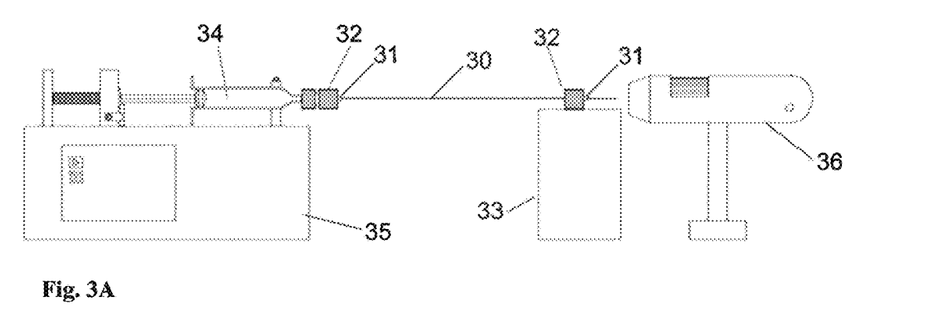
FIGS. 3A-3C are schematic diagrams of apparatus used to prepare a micro-nozzle array, including (A) USB microscope and syringe for confirming water flow from all channels of the MSF, (B) etching MSF end in concentrated HF with water flow, and (C) silanization step showing immersion of etched tip of an emitter into reagent solution.
Figure 3B:
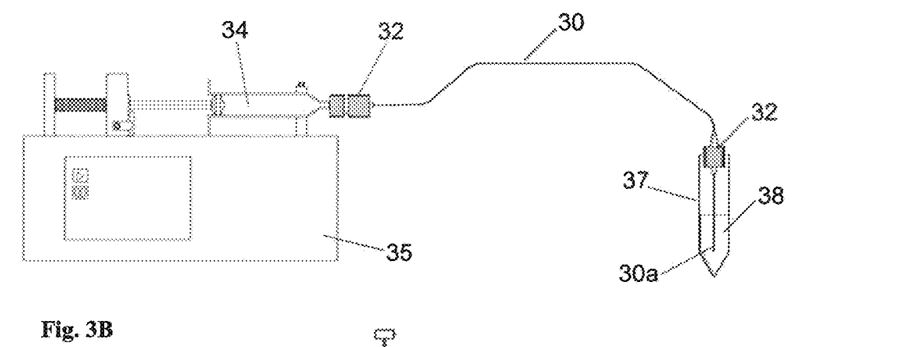

Emitters were prepared in three main steps: (1) cleaving fibre, (2) checking flow, and (3) etching. FIGS. 3A and 3B are schematic diagrams of the apparatus. An 80 cm segment of MSF 30 was cut using a ceramic cleaver. Each end of the fibre was threaded through a 360 µm i.d. polymer sleeve 31 (IDEX, F-185× MicroTight tubing sleeve) with a plastic fitting (IDEX, PK-120BLK) 32. Prior to etching, part of the fibre's protective polyacrylate coating was removed thermally using a wire stripper (Stripall® TWC-1, Teledyne Impulse, San Diego, Calif., USA). A fibre cleaver (LDC-400, Vytran, Morganville, N.J., USA) was then used in the stripped area to produce a straight cleave for etching.

To protect the inside of the fibre channels during etching, water was flowed through each channel. One fitting was attached to a 3 mL plastic syringe 34 filled with deionized water (Protocol®) which was degassed by boiling. A syringe pump 35 (Harvard Apparatus Pump 11 Plus, Holliston, Mass., USA) was used to control the rate of flow. The other end was supported on a stage 33 and observed under an optical microscope (Nikon Eclipse ME600, Nikon Canada, Mississauga, ON, Canada) or a USB microscope (Veho VMS-004D) 36 to ensure all nine channels had water flowing at the desired rate.

After confirmation of flow, the etching end was placed into a microcentrifuge tube 37 (1.5 mL, Fisherbrand™) containing etchant 38 (350 µL of 48 wt % HF (aq)) such that the tip 30a of the MSF was stably suspended in etchant. The fibre was etched with constant flow of water for 14 minutes, and then transferred to a microcentrifuge tube containing water to quench further etching and clean the tip of debris. The fibre was left in the water with a high flow rate of flushing water for 25 minutes. The etched fibre was cleaved at a length of 6-7 cm, and the remaining protective coating was removed to give a final emitter, which was examined by a microscope to determine if all nozzles were generated evenly by the etching process.

Chemical Modification of Emitter

Figure 3C:
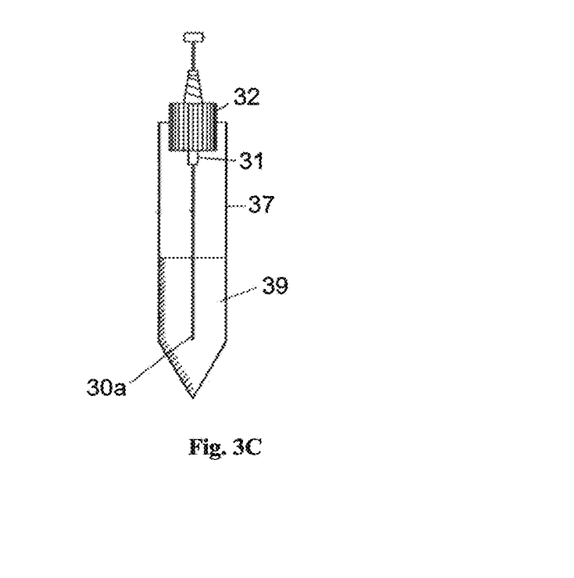

To make the surface of the emitter less wettable by the electrospray solvent, it was chemically modified by a hydrophobic group through a silanization reaction. FIG. 3C is a schematic diagram of the apparatus. After drying the emitter at 150° C. for >6 hours, the tip 30a of the emitter was immersed into the silanization solution 39, comprising 3:1 (v/v) toluene:HFDCS (totaling 400 µL), in the same manner as for etching. This reagent was chosen for its highly hydrophobic properties with an observed contact angle of 111°. A similar procedure was used for silanization with γ-MPS and TFDCS, but these silanes were unable to form stable coatings for as long as HFDCS. The emitters were left in the solution to react overnight, at which time the emitters were rinsed with acetonitrile (95% in water) using an HPLC pump for 20 minutes and stored in a desiccator until needed.

Offline Electrospray Current Measurement and Spray Imaging

Figure 4:
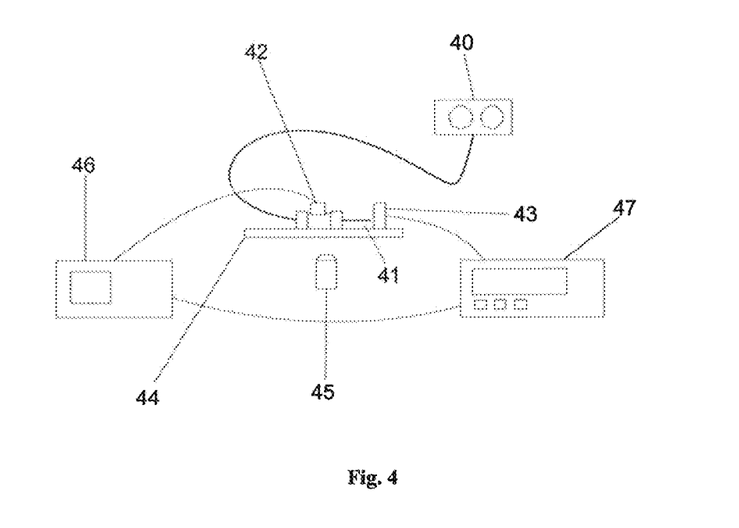
FIG. 4 is a schematic diagram of offline electrospray current measurement and spray imaging apparatus for electrospray testing of an MES emitter.

The experimental setup for measuring the electrospray current and imaging the spray is shown in FIG. 4. A solution of deionized water (79.2% v/v), methanol (19.8% v/v) and glacial acetic acid (1% v/v), degassed and filtered, was delivered to the emitter using a nano-flow gradient pump 40 (IDEX Health & Science LLC, Oak Harbor, Wash., USA). Standard capillary tubing (Polymicro Technologies, Phoenix, Ariz., USA) was used to connect the pump to the emitter 41 through a micro-tee 42 (IDEX Health & Science LLC). Voltage was applied via the micro-tee using a liquid junction with a platinum wire electrode. The emitter was held in place facing an aluminum block ground electrode 43, the tip being 2±0.3 mm away. This entire assembly was placed on the stage 44 of an inverted microscope 45 (Nikon Eclipse Ti-S, Nikon. Canada, Mississauga, Canada), with images and video being captured using a Nikon DS digital camera. The presence and number of stable Taylor cones was easily observed from a side view. Voltage for electrospray was supplied using a high-voltage module 46 (TriSep 2100, Unimicro Technologies, Pleasanton, Calif., USA), and a picoammeter 47 (Model 6485, Keithley Instruments Inc., Cleveland, Ohio, USA) was used to measure the small current generated by the electrospray. Electrospray current was measured for 5 minutes for each run and the mean and standard deviation were used as the data point and uncertainty. For comparison, commercial emitters (SilicaTip™, New Objective, Woburn, Mass., USA) having a 50 µm capillary i.d. tapered at the exit to 8 or 10 µm were obtained and used as directed. Additionally, a solvent gradient from 1% methanol in water to 50% methanol and back was used to test the multi-nozzle emitters for their performance under typical LC conditions.

Online Electrospray Ionization Mass Spectrometry

Emitters were tested online using a Thermo Scientific LTQ Orbitrap Velos hybrid FT mass spectrometer (MS) with a nanoelectrospray source. Emitters were connected via a liquid junction to a syringe pump, which delivered electrospray solution at a given flow rate. The electrospray solution was 50% water/50% acetonitrile (v/v) containing 0.2% formic acid (v/v), in which was dissolved a peptide analyte leucine enkephalin (LE) at 1 µM. Applied positive voltage was optimized for each emitter with respect to total ion current (TIC) and spray stability. TIC was monitored from 400 to 800 m/z, while extracted ion current (XIC) for LE was monitored from 555 to 560 m/z. The emitter was 4±0.3 mm from the MS orifice, and no heat or nebulization gas was utilized. Emitter performance was evaluated by the intensity and stability of the XIC signal of the analyte ion peak of the mass spectrum.

Scanning Electron Microscopy (SEM)

Emitter tips were coated with a thin layer of gold using a Hummer sputtering system (Anatech USA, Union City, Calif., USA) to render the samples conductive. SEM images were obtained using a FEI-MLA (Hillsboro, Oreg., USA) Quanta 650 Field Emission Gun-Environmental SEM.

MSF Fabrication

Figure 5A:
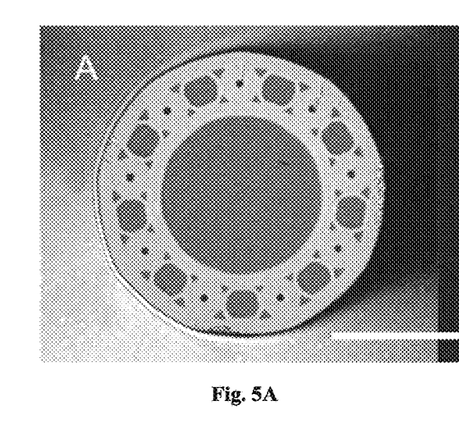
FIGS. 5A and 5B are photomicrograph and SEM images, respectively, of an MSF fibre according to an embodiment with nine channels in a radial array and boron-doped regions (darker areas in FIG. 5A)
Figure 5B:
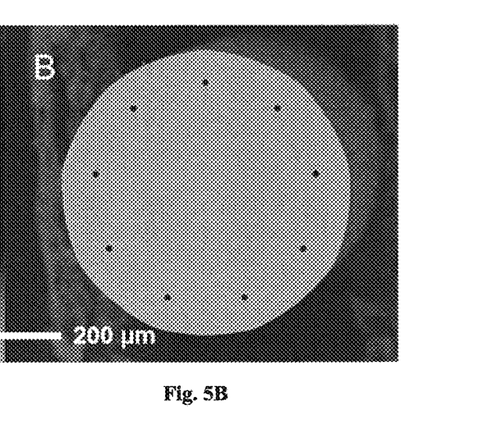

The MSF was designed to have an o.d. matching that of standard fused silica capillary tubing (~360 µm), and 9 channels of ~10 µm diameter ~100 µm apart in a radial pattern. The design of FIG. 1A was assembled into the preform in FIG. 2, which was drawn into the fibre shown in FIGS. 5A and 5B. The SEM image of FIG. 5B shows the simple surface structure of the cross section of the MSF, but the optical image in FIG. 5A shows the nature of the silica composition due to the different refractive indexes of the pure silica and boron-doped regions, which appear darker. From this image it can be seen that the boron-doped silica rods lose their shape and fill in the space around the pure silica tubes, owing to the lower temperature at which the doped silica melts.

From the images in FIGS. 5A and 5B and others like them, the dimensions of the drawn MSF can be measured and compared to targets. The o.d. of the fibre was 363.7±0.8 µm, channel diameter was 8.2±0.1 µm, and the pitch of the channels was 96.3±1.0 µm residing on a centred circle with a diameter of 281.5±2.0 µm. These dimensions are remarkably close to target values, and the homogeneity of the channel diameter is excellent, making the fibre ideal for use in fluidic applications where channel size homogeneity leads to stable flow velocities across all channels.

Etching the MSF Tip to Make Nozzles

The blunt face of the MSF in FIGS. 5A and 5B would not support multiple electrospray (MES) without nozzle formation. Fluid emanating from individual channels is able to wet the flat surface and eventually coalesce into a single electrospray despite the large pitch, radial channel distribution, and even with hydrophobic treatment of the tip by trimethylsilyl groups. Nozzles at the channel exits, however, would provide a better barrier between channels, less surface area to wet, and a finer point closer to the counter electrode upon which the electric field is concentrated leading to stable electrospray at lower voltage.

Figure 6A:
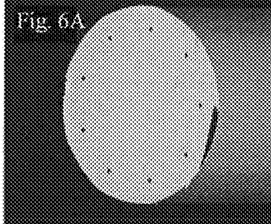
Figure 6B:
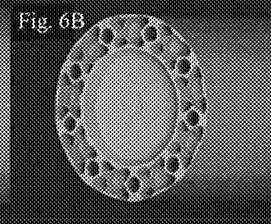
Figure 6C:
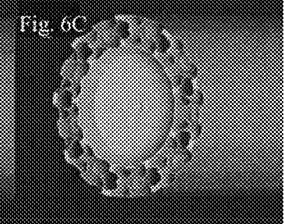
Figure 6D:
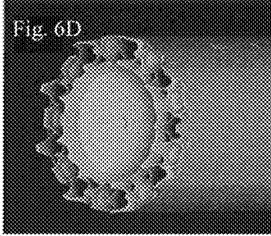
Figure 6F:
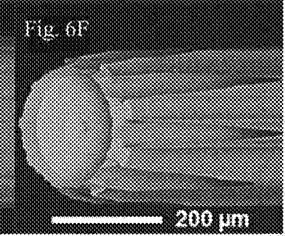

A series of MSF fibres were etched in the HF solution for various times from 6 to 17 minutes. SEM imaging was used to accurately determine the degree of nozzle protrusion and the channel diameter altered by the etching procedure. Representative SEM images shown in FIGS. 6A-6F. As the etching time increases, the pure silica regions are etched at the same rate over the face of the fibre to occupy the same plane, while the boron-doped regions are etched more quickly and occupy a lower plane (FIG. 6B). The silica features, such as the rims defined by the inner and outer silica tubes of the design, are also etched laterally as etchant is able to access the sides of these features after the surrounding borosilicate is removed. At some point, the surface area of these rims is reduced to zero and they become sharp ridges with a defined height relative to the borosilicate plane (FIG. 6C). As etching continues, lateral etching eventually removes all the silica features at the outside of the MSF (FIG. 6F). An important consequence of this lateral etching, however, is the widening of the channels as etchant enters the capillaries and etches the silica there. The diameter of the channels increased to 29±0.5 µm from 8.2 µm after only 6 minutes of etching. Not only does the change in channel diameter affect the electrospray performance, but this etching of the silica that forms the nozzle greatly limits the nozzle's protrusion length. From these measurements, however, the etch rate of the pure silica parts can be calculated to be 1.7 µm/min. Using the decrease in o.d. from 363.7 µm to 340.5 µm over this time as a less accurate estimate, a 1.9 µm/min etch rate is calculated.

In order to protect the etchant from entering the channels and widening the openings, the channels can be filled with a material inert to the etching process and subsequently removed to restore the channels. The simplest way of accomplishing this in a continuous fluid conduit like a MSF is to flow water through the channels from the other end, at a linear velocity that overcomes the diffusion of HF into the channels. Ultimately this approach will dilute the etchant near the tip surface, so the lowest possible flow rate should be used. Empirically, the total flow rate was varied and found to give reproducibly negligible channel widening at 75 nL/min. This low flow rate was found not to significantly affect the etch rate over the etching times studied, so this water flow rate was used for all further etching.

The etching time for MSFs immersed in HF etchant with 75 nL/min water flow was optimized for nozzle shape and protrusion length. As etching time increases, the lateral etching of the silica tubes that form the nozzles causes the silica surrounding the channels to be removed. While the channels are no longer etched from the inside in the presence of flowing water, etching time is essentially limited by the time it takes for the loss of silica to reach the channel. This etching time was found to be 14 min for the fibre design in this example, where the silica remaining around a given channel is only ~10 µm thick, ultimately defining the nozzle tip. Presented in FIGS. 7C and 7D are SEM images showing the face and side views of a MSF face after etching for 14 min in HF with 75 nL/min water counter flow. Measurements indicate that the channels are equivalent in diameter to those prior to etching (8.3±0.2 µm vs. 8.2±0.1 µm, respectively). The nozzle protrusion length, defined as the distance from the tip of the nozzle to the bottom plateau comprised of borosilicate glass (see FIG. 7B), was found to be 60.8±1.2 µm. This translates to borosilicate parts etching 4.3 µm/min faster than silica parts. The o.d. of the MSF decreased from 363.7±0.8 µm to 310.3±1.6 µm over the 14 min, leading to the calculation of a 1.9 µm/min etch rate, consistent with the calculation at 6 min etching time. The borosilicate etch rate, therefore, is about 6.2 µm/min.

Figure 7A:
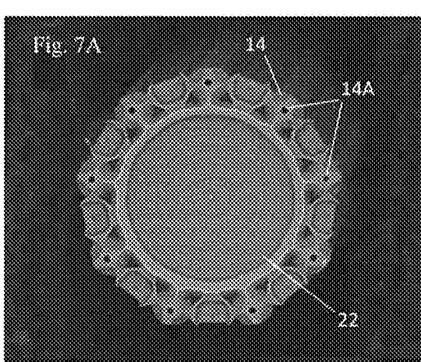
FIGS. 7A-7D are SEM images of MES emitter embodiments made from the MSF of FIGS. 5A and 5B, wherein (A) and (B) are face and side views of an emitter made by etching in HF for 14 minutes with a water flow rate of 75 nL/min, having average nozzle protrusion length of 60.8 μm and channel diameter of 8.3 μm, and (C) and (D) are face and side views of an emitter made by etching for a longer time, where the channels have been exposed.
Figure 7B:
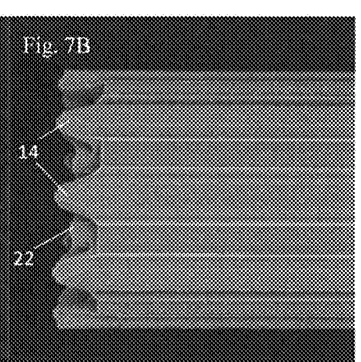
Figure 7C:
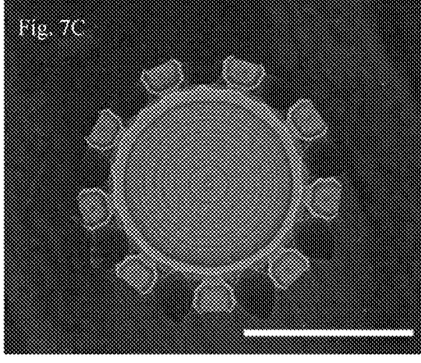
Figure 7D:
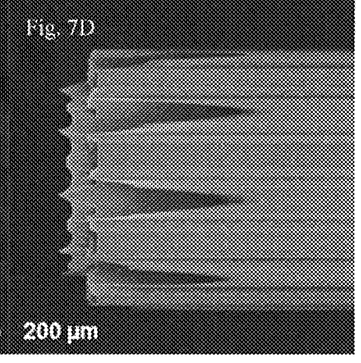

For the MSF design in this example, therefore, a good example of a micro-nozzle array is that shown in FIGS. 7A-7B. To increase nozzle protrusion (i.e., the distance that the nozzles 14A extend beyond the face 22 of the MSF), the pure silica capillaries 14 that define the channels would need to have walls of initially greater thickness, allowing longer etching time before the nozzle tip diameter is minimal. From FIGS. 7A-7B it can be seen that the outer silica tube has been completely removed at this etching time, although etching from the outside of the fibre has not yet reached the channel. Thus, the initial wall thickness of the outer tube (at the MSF perimeter) should also be increased accordingly so that its removal by etching does not expose the channel from the outside at the desired etching time.

Increasing the etching time resulted in exposure of the channels, as shown in FIGS. 7C-7D.

Electrospray Testing and MES Behaviour

Offline electrospray testing was conducted by measuring electrospray current under a variety of conditions and visually monitoring the electrospray mode, using the set-up shown in FIG. 4. For emitters without chemical modification at the emitting end, stable individual Taylor cones were not formed with highly aqueous spray solvent (79.2% water, 19.8% methanol and 1% acetic acid, v/v). Rapid wetting of the surface was observed within 5 seconds despite the nozzles being raised from the MSF tip surface, and the formation of a single large Taylor cone covering the entire tip face was unavoidable.

To counteract this, emitters were functionalized with a silanizing agent to render the tip surface hydrophobic. Various silanizing agents were tested. For a γ-MPS-functionalized emitter, stable multi-electrospray (MES) behaviour was observed for <1 minute before failure led to complete wetting of the MSF tip, an irreversible effect that prevented future MES from that emitter. Stable MES was observed for up to 1 hour using an emitter treated with the fluoroalkyl chlorosilane TFDCS.

Emitters functionalized with the longer-chain silane HFDCS produced stable MES that lasted between 5 and 15 hours of offline testing under acidic (1% acetic acid) conditions. Using di- and tri-chlorosilanes resulted in crosslinking siloxane polymerization reactions and undesirable rough surfaces. It is likely that acid-catalyzed hydrolysis of the siloxane bonds that hold the hydrophobic groups to the surface is the cause of this failure, and indeed the use of less concentrated acid solutions in other testing did appear to improve the longevity of MES for these emitters. Accordingly, mono-chlorosilanes were used in these embodiments.

In all cases, re-functionalizing an emitter after tip wetting renewed MES ability with no apparent deterioration of performance or longevity. It is expected that a more robust treatment, such as a polymeric coating, would greatly improve the robustness and versatility of these MES emitters.

Figure 8:
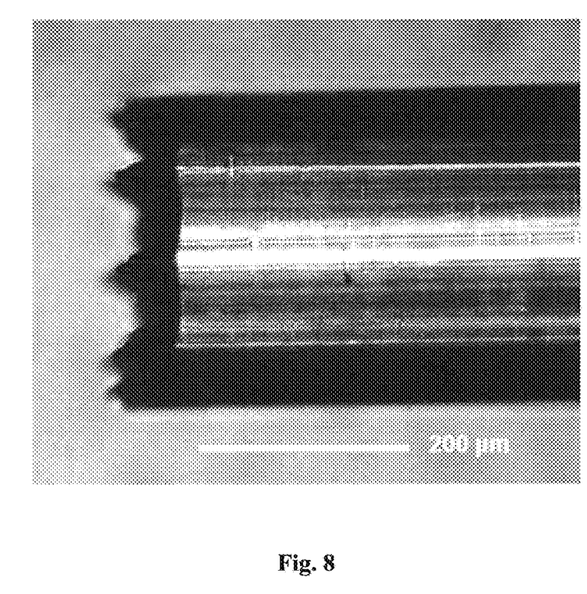
FIG. 8 is a photomicrograph (200× magnification) of nine individual electrosprays (focused on the front two sprays) in stable cone-jet mode generated from a MES emitter with hydrophobic coating (HFDCS)

A photomicrograph showing stable, independent electrosprays in cone-jet mode coming from each nozzle of an emitter with a hydrophobic coating (HFDCS) is shown in FIG. 8, wherein the conditions were 79.8% water/19.2% methanol/1% acetic acid at 300 nL/min total flow rate, 2.8 kV applied potential and 2 mm working distance. The photo is focused on the front two sprays; however, viewing while changing the depth of focus allowed clear visualization and confirmation of all nine individual Taylor cones. The chemical functionalization of the surface and elevation of the nozzles relative to the tip face help to avoid wetting of the face and eventual loss of MES. The pointed shape of the nozzles also helps to concentrate the electric field at the nozzle tip, allowing more stable electrosprays at lower voltage. The radial pattern of the nozzles around the emitter axis positions the nozzles for equivalent exposure to the electric field by equalizing the effects of shielding, but it is apparent from FIG. 8 that electrostatic repulsion of the positive ions in the electrospray plumes causes them to orient themselves off axis.

Further testing revealed that the emitters support MES over a wide range of operating conditions. Nine individual electrosprays were observed for applied voltages of 2.2-3.4 kV (at 0.3 µL/min), with stable cone-jet mode for all nozzles consistently and for extended periods being practically limited to 2.6-3.2 kV. While the voltage is high compared to a single tapered emitter (typically 1-2 kV), shielding of multiple nozzles on a planar emitter face raises the voltage required to invoke a particular electric field at each nozzle. Full MES behaviour was also observed at 2.8 kV for total flow rates from 100 nL/min to 3.0 µL/min. These conditions represent a wide range over which the emitters generate stable MES, and while full characterization of spray conditions was not explored, it is expected that stable MES can be achieved outside of these ranges if one or more other conditions, such as solvent, working distance, voltage, or flow rate, are changed.

Figure 9:
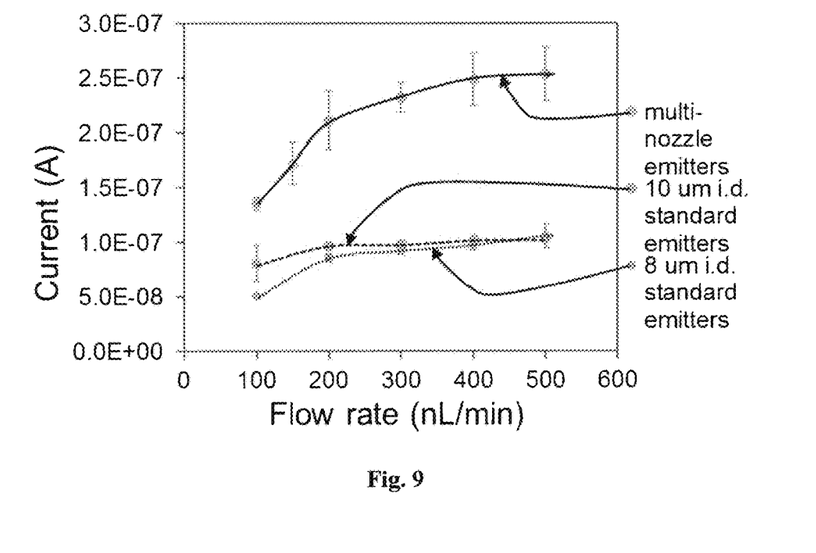
FIG. 9 is a plot of electrospray current as a function of flow rate for multi-nozzle and conventional tapered emitters under optimized voltages of 2.8 kV and 1.2 kV, respectively.
Figure 10:
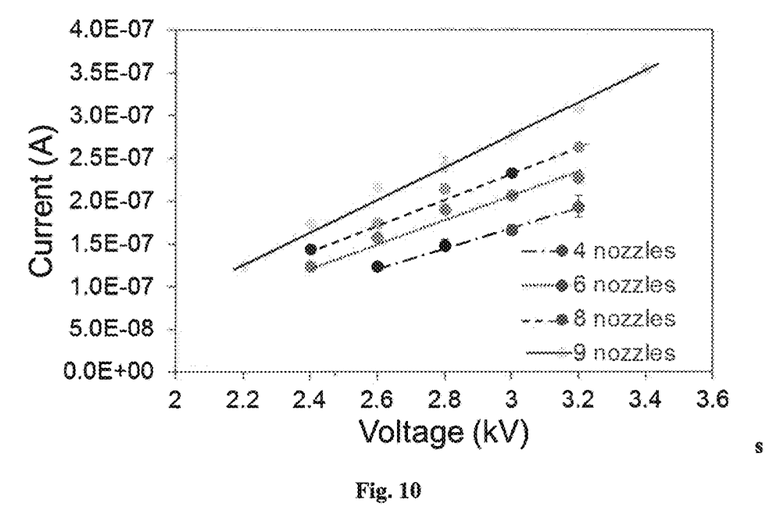
FIG. 10 is a plot of electrospray current as a function of applied voltage for MES emitters at a flow rate of 300 nL/min where each emitter was fabricated in the same manner and blockage of some channels of some emitters allowed measurement of spray current for emitters having 4, 6, 8, or 9 working nozzles.

The electrical current generated by the electrospray was measured for all conditions tested, with the value for a particular condition being the mean current over at least 5 minutes of acquisition time and the uncertainty being the standard deviation of the mean. The electrospray current was plotted as a function of total flow rate at a particular voltage (2.8 kV), presented in FIG. 9, where the electrospray solution was 79.8% water/19.2% methanol/1% acetic acid. The plot follows a square root dependence on flow rate, which arises from the increased supply of charged species at higher flow rates counteracted by poorer ionization efficiency. When the flow rate is held steady, the dependence of the spray current on applied voltage is linear (FIG. 10). As all the nozzles of the emitter are spraying in the same cone-jet regime over all conditions in the plot, and the working distance defines the constant resistance of the system, this linearity is predicted by Ohm's law. These results indicate that each of the nozzles of the emitter are behaving independently as single Taylor cones, without cooperative or interference effects among electrosprays.

Figure 11:
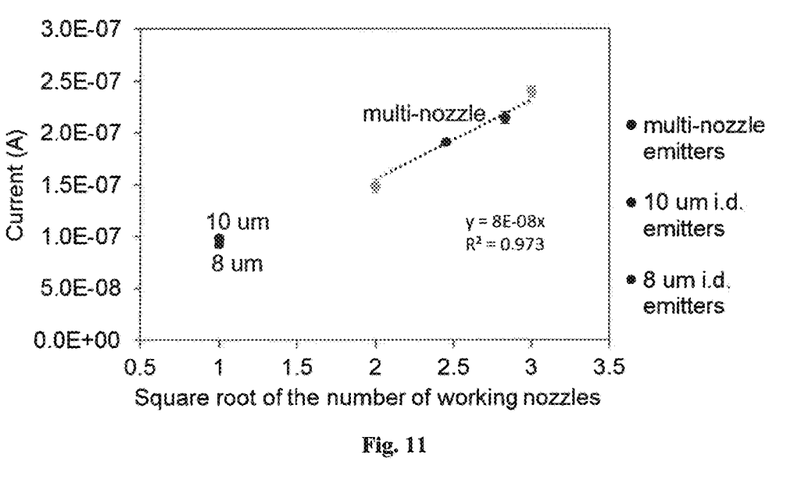
FIG. 11 is a plot of electrospray current as a function of the square root of n (the number of spraying nozzles), for MES emitters.

An aspect of the MES behaviour exhibited by multi-nozzle MSF emitters is the dependence of electrospray current on the number of nozzles. At a given total flow rate, the electrospray current is enhanced by a factor of $\sqrt{n}$ relative to a single electrospray, where n is the number of times that flow is split into individual electrosprays. For the multi-nozzle MSF emitters in this example, fabricating prototypes of a series of designs having more or fewer nozzles was not cost-effective. Instead, some of the channels can be blocked from the inlet end of the MSF such that a fewer number of nozzles are in use. In this way, the same total flow rate and otherwise equivalent electrospray conditions can be applied to the same type of emitter with a variable number of working nozzles. FIG. 11 is a plot of electrospray current at 300 nL/min total flow rate and 2.8 kV, as a function of the square rot of the number of working nozzles (4, 6, 8, or 9). The linear dependence is indicative of true MES behaviour, demonstrating the enhancement of ion signal by splitting the flow into multiple independent electrosprays. A manifestation of the electrospray current dependence on the number of working nozzles appears in the Ohm's law plot of FIG. 10, as noted above, where emitters having more working nozzles exhibited straight lines at higher currents with greater slopes.

Applications

Figure 12:
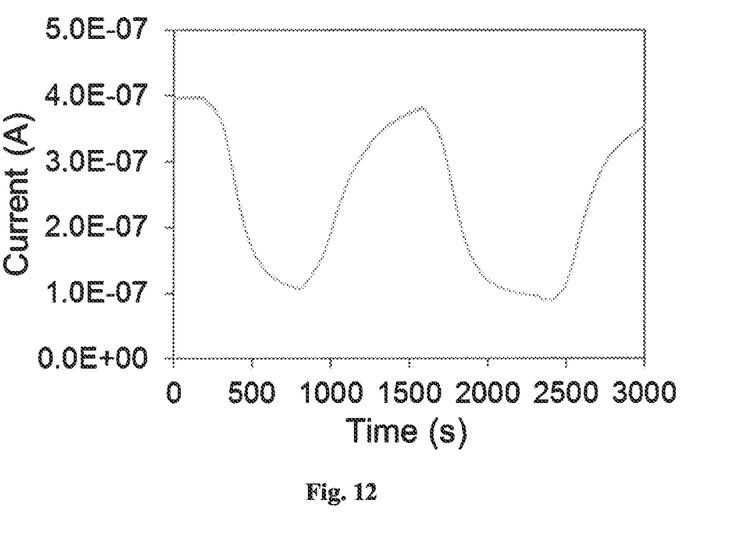
FIG. 12 is a plot of electrospray current as a function of solvent composition for a multi-nozzle MSF emitter.

One application for electrospray emitters is to couple a liquid chromatography (LC) separation to a mass spectrometer for detection. Nearly all LC separations involve the use of a solvent gradient, which aids in the resolution, range, and throughput of a chromatographic separation. For this reason, the multi-nozzle MSF emitters were tested offline with imaging and electrospray current measurement during a change in solvent composition typical in LC/MS. A plot of electrospray current measured over a period of time during which the electrospray solvent changed through two gradient cycles, from 99:1 water:methanol (by volume, with 1% acetic acid) to 50:50 water:methanol, and back, with 2.8 kV applied potential and 300 nL/min flow rate, appears in FIG. 12. During the first minute the initial solvent composition was held constant. The spray current followed the change in solvent composition, without significant change in current each time the solvent composition returned to the same value. It is noted that use of methanol up to 50% by volume did not affect the ability of the hydrophobic coating to maintain multiple electrosprays at the tip face.

Online Electrospray Testing with a Mass Spectrometer

Multi-nozzle MSF emitters were coupled with a Thermo Scientific Orbitrap MS to evaluate their practical application. The enhancement of electrospray current using MES emitter technology manifests in mass spectrometry as increased signal intensity for a given peak in the mass spectrum obtained for a given analyte. Being essentially due to the collective electrospray of lower flow rates generating smaller charged droplets, MES causes a much improved ionization efficiency without sacrificing the benefits of a larger total flow rate. Tests included comparison of extracted ion current of a model analyte for a 9-nozzle MES emitter relative to a single-nozzle tapered emitter, as well as a LC/MS separation using the 9-nozzle MES emitter. Preliminary results show that the MES emitter did not cause chromatographic band broadening, and produced greater signal for the peaks in the chromatogram.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A micro-nozzle array, comprising:
    a plurality of capillaries, each capillary comprising a first silica-based material;
    a second silica-based material, different from the first silica based material, substantially surrounding and contacting the first silica-based material of the plurality of capillaries and filling between the plurality of capillaries;
    a plurality of micro-nozzles extending beyond a face of the micro-nozzle array, each micro-nozzle corresponding to a single capillary;
    wherein each micro-nozzle comprises the first silica-based material;
    wherein the face of the micro-nozzle array comprises the second silica-based material.

2. The micro-nozzle array of claim 1, wherein the micro-nozzles and/or the face of the micro-nozzle array further comprises a treatment or a coating applied thereto.

3. The micro-nozzle array of claim 1, wherein at least one of the first silica-based material and the second silica-based material is doped.

4. The micro-nozzle array of claim 1, wherein the first silica-based material is substantially pure silica.

5. The micro-nozzle array of claim 1, wherein the second silica-based material is boron doped silica.

6. The micro-nozzle array of claim 1, used in a hydrodynamic application.

7. The micro-nozzle array of claim 1, used in an electro-osmotic application.

8. A hydrodynamic or electro-osmotic device comprising the micro-nozzle array of claim 1.

9. A MES emitter comprising the micro-nozzle array of claim 1.

10. A method of preparing a micro-nozzle array, comprising:
    micro-machining a MSF comprising:
        a plurality of capillaries, each capillary comprising a first silica-based material; and
        a second silica-based material, different from the first silica based material, substantially surrounding and contacting the first silica-based material of the plurality of capillaries and filling between the plurality of capillaries;
    wherein the micro-machining produces a plurality of micro-nozzles extending beyond a face of the array, each micro-nozzle corresponding to a single capillary;
    wherein each micro-nozzle comprises the first silica-based material;
    wherein the face of the micro-nozzle array comprises the second silica-based material.

11. The method of claim 10, further comprising applying a treatment or a coating to the micro-nozzles and/or the face of the array.

12. The method of claim 10, wherein at least one of the first silica-based material and the second silica-based material is doped.

13. The method of claim 10, wherein the first silica-based material is substantially pure silica.

14. The method of claim 10, wherein the second silica-based material is boron doped silica.

15. The method of claim 10, wherein micro-machining comprises chemical etching the face of the MSF.

16. A method comprising using the micro-nozzle array of claim 1 in a hydrodynamic application.

17. A method comprising using the micro-nozzle array of claim 1 in an electro-osmotic application.

18. A method comprising using the micro-nozzle array of claim 1 as a MES emitter.

* * * * *